E. G. STEINMETZ & E. W. SMITH.
SECONDARY OR STORAGE BATTERY.
APPLICATION FILED JULY 12, 1909.

1,051,645.

Patented Jan. 28, 1913.

WITNESSES:
Rob't R. Kitchel.
Frank O. Funck.

INVENTORS.
Edward G. Steinmetz
& Edward W. Smith
BY
Augustus B. Stoughton
ATTORNEY.

UNITED STATES PATENT OFFICE.

EDWARD G. STEINMETZ AND EDWARD WANTON SMITH, OF PHILADELPHIA, PENNSYLVANIA, ASSIGNORS TO THE ELECTRIC STORAGE BATTERY COMPANY, OF PHILADELPHIA, PENNSYLVANIA, A CORPORATION OF NEW JERSEY.

SECONDARY OR STORAGE BATTERY.

1,051,645.

Specification of Letters Patent. Patented Jan. 28, 1913.

Application filed July 12, 1909. Serial No. 507,156.

*To all whom it may concern:*

Be it known that we, EDWARD G. STEINMETZ and EDWARD W. SMITH, both citizens of the United States, residing at the city of Philadelphia, in the county of Philadelphia and State of Pennsylvania, have jointly invented certain new and useful Improvements in Secondary or Storage Batteries, of which the following is a specification.

The principal object of the present invention is to provide a novel plate or electrode which shall in use possess the advantages of a plate or electrode consisting of an assemblage of units each comprising a rod or core around which active material or material to become active is confined by an envelop or cover consisting of a pile or series of separate washers, and which novel plate or electrode can be comparatively inexpensively and readily manufactured by the aid of commercial machinery, and which novel plate or electrode in use possesses the added advantages not only of mechanical strength but also of durability in the sense that strong portions of an integral or one-piece envelop may be exposed to wear and in the sense that breakage or injury to weak portions of the envelop or cover are localized and their injurious effects or results minimized.

The invention will be claimed at the end hereof but will be first described in connection with the accompanying drawings illustrating embodiments of the invention and in which—

Figure 1:
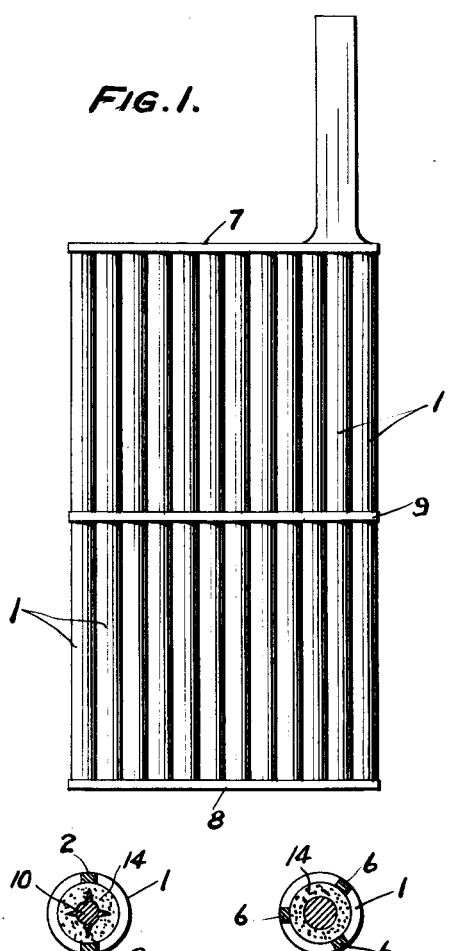
Figure 2:
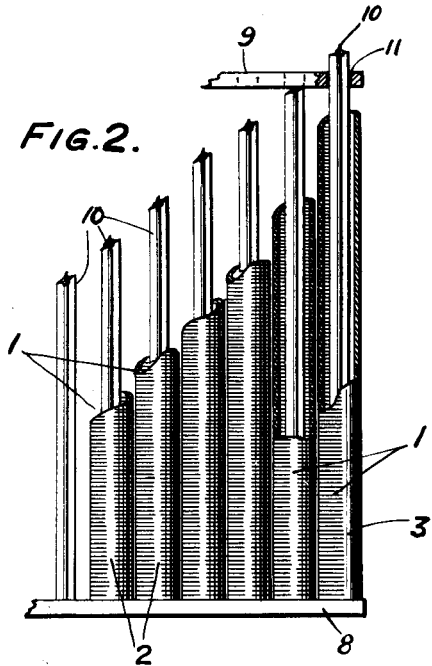
Figure 6:
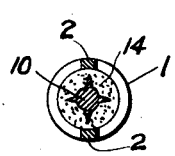
Figure 7:
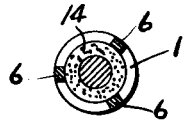
Figure 3:
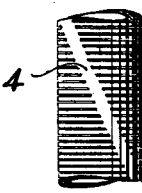
Figure 4:
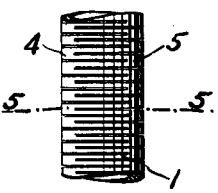
Figure 8:
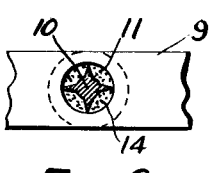
Figure 9:
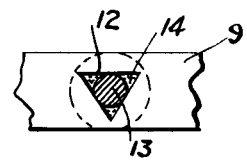
Figure 5:
Figure 10:

Figure 1, is a side view of a plate or electrode embodying features of the invention. Fig. 2, is a similar view partly in section, drawn to an enlarged scale and illustrating portions of a plate like that shown in Fig. 1. Figs. 3 and 4, are views drawn to an enlarged scale and illustrating tubular envelops or covers embodying modifications of the invention. Fig. 5, is a transverse sectional view of an edge cover or envelop shown in Fig. 2, and it illustrates in section one of the webs which connects the parts between the slots and constitutes a wear resisting portion. Fig. 6, is a sectional view drawn to an enlarged scale and illustrating one of the units shown in Fig. 2. Fig. 7, is a similar view illustrating a modification. Fig. 8, is a plan view, partly in section, taken above the intermediate grid section in Fig. 1. Fig. 9, is a similar view illustrating a modification, and Fig. 10, is a section on the line 5—5, of Fig. 4.

In the drawings 1, Figs. 2 and 6, is an envelop or cover of tubular form. It should consist of inert insulating material of which hard rubber is an example. This tubular envelop or cover is slotted partway across it and has webs connecting the parts between the slots. In Fig. 6, the webs are shown at 2, and they are arranged diametrically opposite each other. The slots should constitute real openings rather than mere cuts. That is to say, it is well to remove some of the material in their manufacture or as an alternative the webs might be somewhat stretched and elongated. The slots are of a width comparable to the thickness of an ordinary sheet of paper and they are very close together, for example, there may be thirty slots to the inch. These dimensions are given for the sake of description and not by way of limitation. By arranging the webs in diametrically opposed positions as in Figs. 2 and 6, they constitute wear resisting portions at the faces of the plate. As shown in Fig. 5, there is but one web 3, and it is arranged to extend partway around the tube. Such a web 3, is adapted for use on the end unit of the plate and it constitutes a wear resisting portion. The number of webs and the location thereof may be varied. For instance, in Fig. 3, the webs 4, are arranged spirally and in Figs. 4 and 10, the slots are made alternately from opposite sides so that the webs 4 and 5, are staggered. In Fig. 7, there are three webs 6, and they are spaced equidistantly. The material between the slots constitutes in effect a pile of washers, each washer being spaced apart from its neighbors by the webs. This washer construction is advantageous because among other things it serves to retain or prevent the escape of the active material or material to become active so that the battery does not require to be cleaned. The webs by connecting these washers permit the cover to be handled as a unit which is advantageous during manufacture, in filling it with active material or material to become active, more especially by mechanical means. Furthermore if one or more portions of the tube between the slots becomes broken the webs serve to hold the other similar portions in proper position and thus the results of the breakage are localized and minimized.

7 and 8, are metallic end grid sections, and 9, is an intermediate grid section. Any number of such sections may be used. These sections are not as wide as the diameters of the tubes so that the latter insulate the former in respect to adjacent plates or keep them out of bearing contact with separators.

10, are metallic rods connecting the end sections. These rods 10, pass through openings 11, in the intermediate grid section 9. The rods do not fill the openings and there is space between the rods and the walls of the openings for a purpose to be described. As shown in Figs. 2 and 8, the openings 11, are circular and the rods 10, are longitudinally ribbed. The ribs touch the wall of the opening and thus afford space and at the same time center the rod. In Fig. 9, the opening 12, has straight sides and the rod 13, is cylindrical so that space is afforded. The purpose of the space is to permit of the introduction of active material or material to become active 14, through the tubular covers and past the intermediate grid section 9. It is important in using machinery for filling the tubes that the material can be fed past the intermediate grid section 9, and the space referred to permits of the accomplishment of this.

For the sake of description it can be assumed that prior to the application of the grid section 7, the active material or material to become active is introduced through the tubes 1, at that end of the plate and this material passes through these tubes past the intermediate grid section 9, into the tubes on the other side of that section, thus filling the upper and lower tubes.

The described plate is well adapted for use as a positive pole plate but we do not intend to exclude the application of the features of our invention to negative pole plates, nor do we intend to limit our patent to a structure in which each of the described features of invention is present because some of the features can be used advantageously without the others.

We do not claim herein the envelop or cover described by itself as it forms the subject matter of our application for a patent Serial No. 636,469, filed July 1st, 1911.

What we claim is:

An electrode comprising a conductor and active material or material to become active and a surrounding stack or pile of thin insulating washers superposed and forming a cylindrical wall contacting throughout with said material and provided with minute pores or crevices between the washers through which the electrolyte may pass and through which active material may not readily pass, in combination with insulating webs connecting said washers to hold them properly spaced in the form of a tube-like structure possessed of mechanical strength.

In testimony whereof we have hereunto signed our names.

EDWARD G. STEINMETZ.
EDWARD WANTON SMITH.

Witnesses:
K. M. GILLIGAN,
FRANK E. FRENCH.